United States Patent
Yochai

(10) Patent No.: US 9,727,486 B1
(45) Date of Patent: Aug. 8, 2017

(54) WRITING PAGES TO A STORAGE SYSTEM

(71) Applicant: Yechiel Yochai, Moshav Aviel (IL)

(72) Inventor: Yechiel Yochai, Moshav Aviel (IL)

(73) Assignee: INFINIDAT LTD., Herzliya (IL)

( * ) Notice: Subject to any disclaimer, the term of this patent is extended or adjusted under 35 U.S.C. 154(b) by 61 days.

(21) Appl. No.: 14/849,763

(22) Filed: Sep. 10, 2015

(51) Int. Cl.
*G06F 12/00* (2006.01)
*G06F 12/123* (2016.01)
*G06F 12/0831* (2016.01)

(52) U.S. Cl.
CPC ........ *G06F 12/123* (2013.01); *G06F 12/0833* (2013.01); *G06F 2212/62* (2013.01); *G06F 2212/69* (2013.01)

(58) Field of Classification Search
None
See application file for complete search history.

(56) References Cited

U.S. PATENT DOCUMENTS

2006/0248088 A1* 11/2006 Kazar .................... G06F 3/0611
2014/0208001 A1* 7/2014 Liu ........................ G06F 3/0685
711/103

* cited by examiner

*Primary Examiner* — Daniel Tsui
(74) *Attorney, Agent, or Firm* — Reches Patents

(57) ABSTRACT

A method for writing data objects, the method may include accumulating, in a first memory module, multiple new data entities in one or more dirty pages of a data layer; wherein each new data entity and a corresponding older data entity are associated with a same application object; wherein the accumulating comprises storing each new data entity in a page that differs from a page that stores the corresponding older data entity; calculating multiple new sets of descriptors by generating to each new data entity, a new set of descriptors; wherein each set of descriptors comprises descriptors that belong to multiple descriptors layers; wherein the multiple descriptors layers and the data layer belong to an hierarchical data structure; accumulating the multiple new sets of descriptors in one or more dirty pages of one or more descriptors layers; wherein each corresponding older data entity is associated with a corresponding set of descriptors; wherein the accumulating comprises storing each new set of descriptor in a page that differs from a page that stores a corresponding set of descriptors; and writing the multiple new data entities and the multiple new sets of descriptors to a second memory module.

20 Claims, 8 Drawing Sheets

WRITING PAGES TO A STORAGE SYSTEM

BACKGROUND

Paging is a memory management technique that allows applications to refer to a virtual memory having a size that is larger than the available physical memory (e.g., RAM—Random Access Memory), by using a secondary storage for data that does not fit into the physical memory. The secondary storage is generally a non-volatile storage, such as SSD (Solid State Device), because such kind of storage is usually much cheaper than RAM and suitable for storing a larger amount of data than is feasible to be saved in RAM. Using a non-volatile storage is a must when the data managed in the virtual memory is updated and needed to be saved in a persistent repository. The virtual memory space is divided into fixed size blocks, called pages. A page that is not currently in the RAM is swapped into the RAM from the secondary storage upon demand to read/write from/to a virtual address covered by the page. If there is no empty space in the RAM for accommodating the requested page, then another page, which is not being used, is swapped out (evicted, paged-out) from the RAM. If the page is dirty, i.e., contains data that was not written to the secondary storage, then the dirty page should be flushed (written) to the secondary storage, prior to being evicted from the RAM.

Operating Systems (OS) generally provide paging mechanism to applications that handle a large amount of data. However, the application has no control on when and how the data is paged out to the secondary storage, leading to a problem of consistency, where the persistent image on the secondary storage does not represent a consistent point in time of the application data, so upon recovery from failure, the data that is read to memory would not comply with a consistent point in time. The OS's paging mechanism further requires that the data is stored on the secondary storage in exactly the same way it is represented in the memory. Therefore, when a substantial number of pages that reside in memory are even slightly amended, flushing of dirty pages involves a large amount of data that is needed to be written to the secondary storage, since the entire page is written.

There is a need to minimize the flush time of dirty data from the memory when large amount of data updates is expected, especially when the updates involve small data portion across many pages, and also especially in cases where during flush, access to the virtual memory is needed to be blocked, so as not to ruin a consistent image in the secondary storage.

SUMMARY

According to an embodiment of the invention there may be provided a non-transitory computer readable medium that may store instructions that once executed by a storage system cause the storage system to execute a method.

According to an embodiment of the invention there may be provided a method for writing data objects, the method may include accumulating, in a first memory module, multiple new data entities in one or more dirty pages of a data layer; wherein each new data entity and a corresponding older data entity are associated with a same application object; wherein the accumulating may include storing each new data entity in a page that differs from a page that stores the corresponding older data entity; calculating multiple new sets of descriptors by generating to each new data entity, a new set of descriptors; wherein each set of descriptors may include descriptors that belong to multiple descriptors layers; wherein the multiple descriptors layers and the data layer belong to an hierarchical data structure; accumulating the multiple new sets of descriptors in one or more dirty pages of one or more descriptors layers; wherein each corresponding older data entity is associated with a corresponding set of descriptors; wherein the accumulating may include storing each new set of descriptor in a page that differs from a page that stores a corresponding set of descriptors; and writing the multiple new data entities and the multiple new sets of descriptors to a second memory module.

The data layer and all of the multiple descriptor layers except of a root layer may be dynamic layers in which new content of a given layer that replaces an older content of the given layer is stored, within the given layer, at a different location from a location of the older content.

The data layer and all of the multiple descriptor layers may be dynamic layers in which new content of a given layer that replaces an older content of the given layer is stored, within the given layer, at a different location from a location of the older content.

The method may include dynamically allocating in each descriptor layer, except a root layer, a dirty page for accumulating new descriptors of the new sets of descriptors that belong to the descriptor layer.

The method may include dynamically allocating in each descriptor layer a dirty page for accumulating new descriptors of the new sets of descriptors that belong to the descriptor layer.

Each layer of the hierarchical data structure may be smaller than another layer of a lower level in the hierarchical data structure.

The multiple descriptors layers may include a lowest descriptors layer and one or more higher descriptors layers; wherein the lowest descriptors layer stores lowest descriptors, each lowest descriptor is indicative of a status of a page of the data layer; and wherein each higher descriptors layer of the one or more higher descriptors layers stores higher descriptors, each higher descriptor is indicative of a status of a page of a lower descriptors layer of the multiple descriptors layers.

The multiple descriptors layers may include a lowest descriptors layer and one or more higher descriptors layers; wherein a given lowest descriptor may include status information about a given page of the data layer, wherein the status information is indicative of status of slots of the given page of the data layer, wherein the status of the slots indicates which slots of the given page of the data layer are occupied and which slots of the given page of the data layer are free.

The method may include storing a persistent copy of the hierarchical data structure in the second memory module.

The method may include maintaining a list of dirty pages of the data layer.

The method may include maintaining a list of dirty pages of the hierarchical data structure.

The method may include loading to the first memory module and from a second memory module, during an initialization procedure, only a portion of the hierarchical data structure while starting the loading from the multiple descriptors layers.

The method may include loading to the first memory module and from a second memory module, during an initialization procedure, only non-swappable pages of the hierarchical data structure.

The method may include loading to the first memory module and from a second memory module, during an initialization procedure, only the multiple descriptors layers.

The method further may include determining a structure of the hierarchical data structure in response to a predefined size ratio between adjacent layers of the hierarchical data structure.

The writing of the multiple new data entities and the multiple new sets of descriptors to the second memory module may include freezing all dirty pages that store the multiple new data entities and the multiple new sets of descriptors.

The multiple sets of descriptors may include multiple root layer descriptors of a root layer and multiple other descriptors; wherein the writing of the multiple new data entities and the multiple new sets of descriptors to the second memory module may include writing all the dirty pages that store the multiple data entities and the multiple other descriptors to the second memory module; writing the root layer to the second memory module; and aggregating, during the writing to the second memory module of the root layer and all the dirty pages that store the multiple data entities and the multiple other descriptors, content related to any new data entity of the multiple new data entities, in one or more new dirty page of the first memory module.

The method may include marking a space occupied by an older data entity as irrelevant.

The method may include calculating, for each older data entity, an updated set of descriptors that indicates that at least one lowest descriptor of a corresponding set of descriptors is irrelevant thereby generating multiple updated sets of descriptors.

The calculating of the multiple updated sets of descriptors may be followed by accumulating, in the first memory module, the multiple updated sets of descriptors in one or more dirty pages of the data layer.

According to an embodiment of the invention there may be provided a non-transitory computer readable medium that stores instructions that once executed by a storage system will cause the storage system to accumulate, in a first memory module, multiple new data entities in one or more dirty pages of a data layer; wherein each new data entity and a corresponding older data entity are associated with a same application object; wherein the new data entity and the corresponding older data entity are stored in different pages of the first memory module; calculate multiple new sets of descriptors by generating to each new data entity, a new set of descriptors; wherein each set of descriptors may include descriptors that belong to multiple descriptors layers; wherein the multiple descriptors layers and the data layer belong to an hierarchical data structure; wherein each corresponding older data entity is associated with a corresponding set of descriptors; wherein a new set of descriptors and a corresponding set of descriptors are stored in different pages of the first memory module; accumulate the multiple new sets of descriptors in one or more dirty pages of one or more descriptors layers; and write the multiple new data entities and the multiple new sets of descriptors to a second memory module.

According to an embodiment of the invention there may be provided a storage system that may include a first memory module, a second memory module and a controller; wherein the controller is configured to accumulate, in the first memory module, multiple new data entities in one or more dirty pages of a data layer; wherein each new data entity and a corresponding older data entity are associated with a same application object; wherein the new data entity and the corresponding older data entity are stored in different pages of the first memory module; calculate multiple new sets of descriptors by generating to each new data entity, a new set of descriptors; wherein each set of descriptors may include descriptors that belong to multiple descriptors layers; wherein the multiple descriptors layers and the data layer belong to an hierarchical data structure; wherein each corresponding older data entity is associated with a corresponding set of descriptors; wherein a new set of descriptors and a corresponding set of descriptors are stored in different pages of the first memory module; accumulate the multiple new sets of descriptors in one or more dirty pages of one or more descriptors layers; and write the multiple new data entities and the multiple new sets of descriptors to the second memory module.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
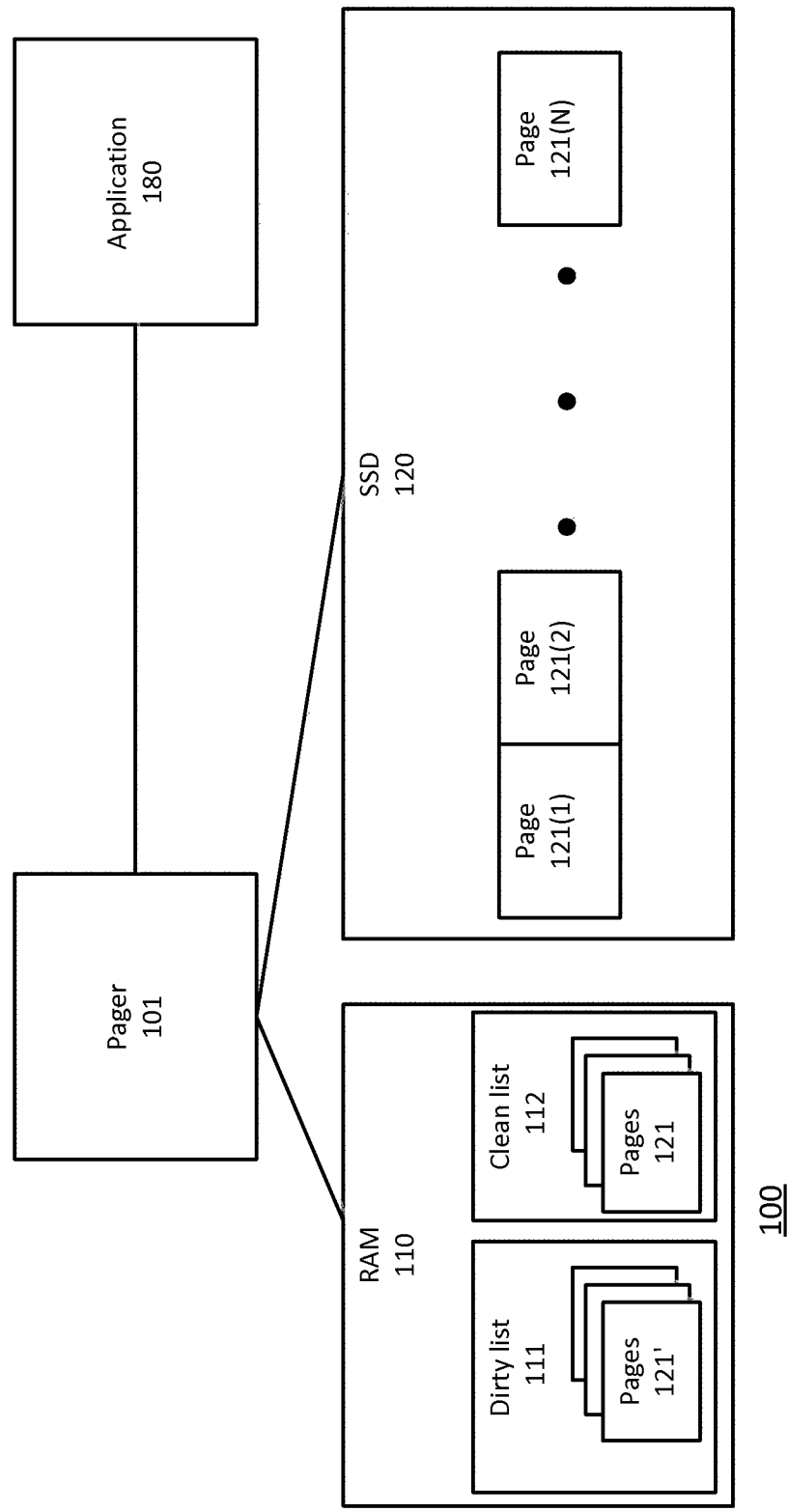
FIG. 1 illustrates a storage system according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The following methods and system provide a paging service for applications that require large memory for storing objects and vast amount of updates to the stored objects, for example, one million updates per second. The term paging hereinafter refer to a memory management that uses a primary storage, which provides fast memory access, such as RAM, and a secondary storage, which is a non-volatile storage, that stores all the data of an application, divided into pages that can be paged in and out of the primary storage. The space reserved for application data in the secondary storage may be substantially larger than the space reserved in the primary memory, or otherwise, may have substantially the same size as the primary storage. In the former case, the primary memory operates as a cache memory that stores the most important data and the secondary storage is used for data that does not fit into the primary memory. In the latter case, the primary storage is used for providing all access requests (read/write), where dirty data (updated data in the primary memory) is saved to the secondary storage periodically or constantly, as a background process.

Each page includes multiple application objects, which are data containers of the application that uses the paging service. The paging service is not aware of the format of the objects.

Assuming that the updates per second affect around half a million objects, randomly scattered across different pages, and needed to be flushed to the secondary storage every e.g., one second, then even if the secondary storage is a fast storage device, such as SSD (currently known high level SSDs can handle workload of around 200 MB/sec of random writes with page size of 16K for four years), it is far from being sufficient to support the excessive flushing required for such intensive update environment.

According to embodiments of the present invention, the paging service reduces the number of dirty pages, by accumulating dirty objects that belong to various pages into fewer dirty pages in the primary memory, so that flushing is done for full pages, as much as possible, rather than to numerous partially dirty pages. Updating objects is done in a write-out-of-place manner, i.e., when data of an existing object is being overwritten, the updated object is reallocated from its previous clean page into a page that is already a candidate for flushing, i.e., a dirty page that accumulates dirty objects.

The reallocating of objects requires changes in metadata items that describe the allocation of objects to pages. These metadata items, referred to hereinafter as 'descriptors', are not stored within the pages they describe so as not to cause a clean page to become dirty when an object is removed from the clean page for purpose of reallocation. The descriptors are hosted within separate pages, where multiple descriptors are hosted within one page, in a similar manner as with application objects. The descriptors themselves may occupy non-negligible space. In the following examples, it is assumed that a page of a size of e.g., 64 Kb, can include hundreds or thousands of application objects and that in order to describe the page and the object allocation of the page, the ratio between the page and a descriptor describing it, is 128:1. So, the reallocation of application objects from their original page to a dirty page upon update, produces also updates to the descriptors that describes the original and the target pages and therefore creates a substantial amount of dirty descriptors, that can be scattered across substantial amount of dirty pages, all over the secondary storage, especially when extensive spatial random updates take place.

Therefore, the objects that are being accumulated are not only the data of the application that uses the paging service, but also descriptors that include metadata describing pages. A descriptor that describes a certain page is changed whenever an object within the certain page is reallocated to or from the certain page, and therefore the descriptor also becomes dirty and should be reallocated into a dirty page, as done with any updated application object.

Since the descriptors are also being reallocated for the purpose of accumulation, there is a need to have yet another higher layer of descriptors, which includes metadata describing the allocation of descriptors into pages. The higher layer descriptors are also grouped into pages, though fewer pages than lower layers. If still this higher layer of descriptors occupies substantial amount of space, there is still a need to undergo the same process of reallocation upon update and accumulation of dirty descriptors. The reallocation for accumulating dirty data is performed for several descriptor hierarchies, until reaching a top hierarchy, which is relatively small. The top hierarchy is static, i.e., does not undergo reallocation.

FIG. 1 illustrates a system 100 that includes a controller such as a pager 101 for managing the paging and for providing paging services to applications, such as an application 180 according to an embodiment of the invention. FIG. 1 illustrates application 180 as being part of system 100, but, applications that request the paging service may be otherwise external applications and not necessarily part of system 100, but may have a communication interface with system 100. System 100 manages for application 180 a hierarchical data structure 250 that will be described in FIGS. 2A-2C. Multiple hierarchical data structure s for one or more applications can be handled by system 100.

System 100 further includes a primary storage, such as a RAM 110 and a secondary storage, such as an SSD 120. The hierarchical data structure in its entirety is stored in the secondary storage and at least part thereof is cached in the primary storage. Since volatile memories are much faster than storage devices, the primary storage is likely to be a volatile memory, and hence—RAM 110. The secondary storage is a non-volatile storage, since there is a need to save a persistent copy of the data cached in the RAM. Besides, the hierarchical data structure may be too big to fit into the RAM, so that at any moment, most or at least part of the hierarchical data structure is stored only in the secondary storage, which may be much bigger than the primary storage. In some embodiments of the present invention the entire hierarchical data structure can be stored also in RAM 110, in addition to being stored in SSD 120.

The hierarchical data structure is represented by N pages 121 and SSD 120 stores all the pages 121(1)-121(N). RAM 110 stores at least part of pages 121. Some of the pages may be clean pages that are identical to corresponding pages in the SSD and may be arranged in clean list 112. Some of the pages are dirty pages 121'. These pages correspond to pages stored in the SSD but contain updates that are not yet reflected in the equivalent pages in the SSD. Dirty pages 121' may be arranged in a dirty list 111.

Figure 2A:
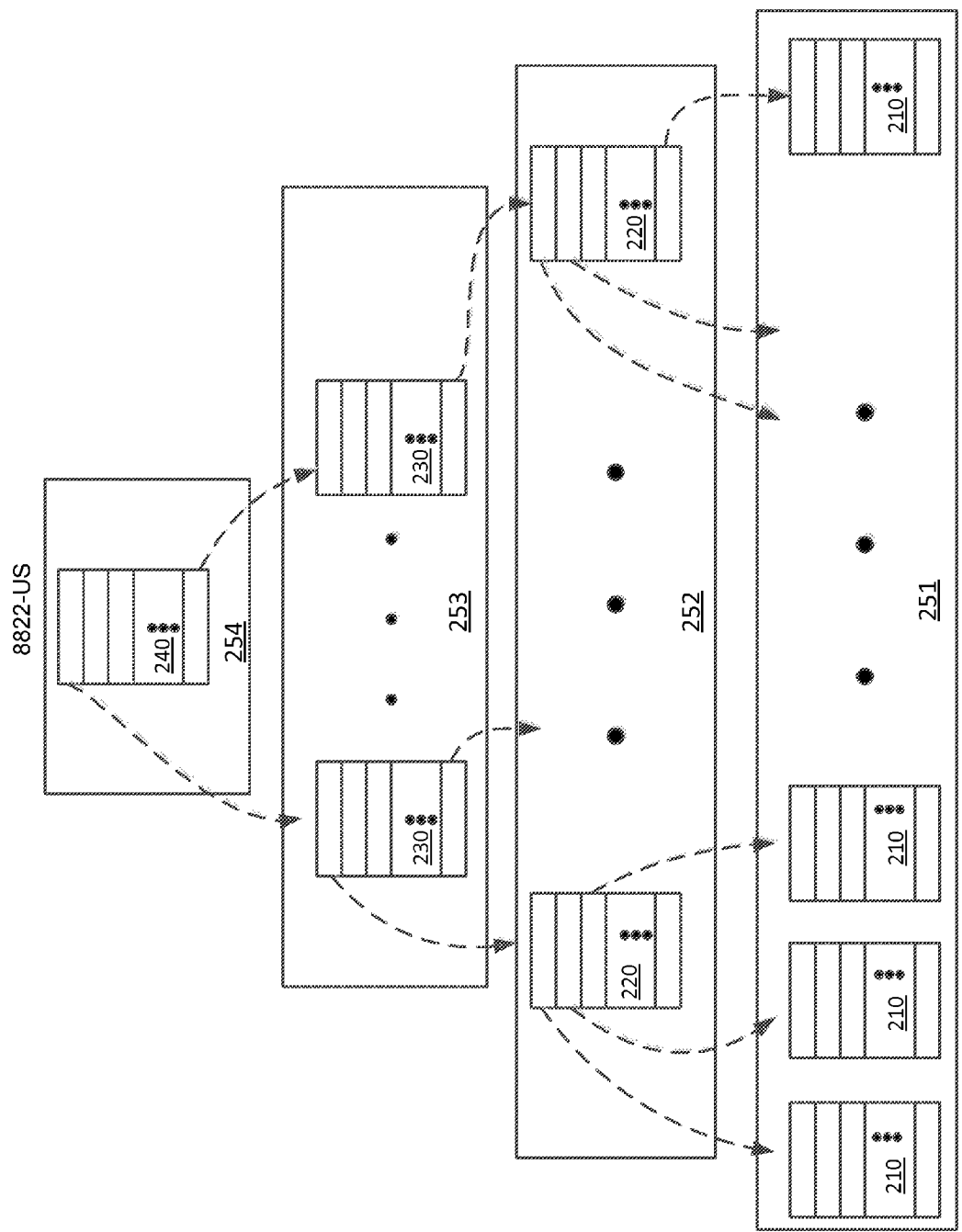
FIG. 2A illustrates a hierarchical data structure according to an embodiment of the invention.

FIG. 2A illustrates a hierarchical data structure 250 that includes a hierarchical set of pages for managing data of an external application according to an embodiment of the invention.

Each page contains multiple objects. The objects can be application objects (application data) or can be descriptors of any hierarchy layer.

A bottom layer 251 of hierarchical data structure 250 contains pages 210 that are used for hosting the application objects. These pages are dynamic pages in a sense that the objects contained in these pages can be reallocated, i.e., moved from one first layer page 210 to another first layer page 210 when becoming dirty.

As illustrated by dashed arrows, each of pages 210 is associated with a descriptor that is placed in a second layer page 220 in a layer 252 above layer 251. If the size of the space occupied by all pages 220 of layer 252 is greater than a predefined size threshold, than layer 252 is a dynamic layer, i.e., the hosted descriptors are subject to reallocation upon update, i.e., moved from one second layer page 220 to another second layer page 220 when becoming dirty. Since the layer is dynamic, there is yet another layer above it, e.g., layer 253. Pages 230 in layer 253 contain descriptors for describing the descriptors in the pages 220 of lower layer 252. Pages 230 of layer 253, in the illustrated example, occupied a size that still exceeds the predefined size threshold, therefore, this layer is also dynamic and described by descriptors in another higher layer 254. Layer 254 is the top layer and has a limited amount of pages 240 that occupy less than the predefined size threshold and therefore layer 254 is static, i.e., the descriptors in this layer are contained in fixed pages and are not subject to reallocation from one page 240 to another page 240 upon update. In this example, there is only a single page in the top layer, but the top layer may contain few pages, e.g., 16 pages. The pages of the top layer are stored in a well-known address in the non-volatile memory.

Pages 210-240 are stored in the secondary storage (SSD 120) and at least part of then are cached in the primary storage (RAM 110).

The following example is for explaining how the number of hierarchies is determined, given a requested space for application data. Suppose the maximum amount of application data, expected to be stored using the paging mechanism, is 1 Tb (Tera byte), grouped into pages in the bottom layer, each page having a size of e.g., 64 K bytes, and suppose a size of a descriptor is 512 bytes. Since for each 64 KB of data there are 512B of metadata (descriptors) in the layer above, the ratio between the capacity of the bottom layer to the capacity of the descriptors one layer above can be calculated: 64K/512=128. The same ratio applies to all layers, i.e., each layer has a capacity that is $1/128$ of one layer below. The following table shows the storage capacity of each layer, given that the application data is of 1 TB:

| Layer | Capacity |
| --- | --- |
| 1 (bottom, Application data) | 1 TB |
| 2 (lowest descriptor layer) | 8 GB |
| 3 | 64 MB |
| 4 (root or top) | 1 MB |

The top layer occupies 1 Mb, which forms 16 pages of 64 KB. Given that SSD can handle 300 MB/sec of random writes with page size of 64 KB, this is an acceptable capacity for the top layer, because even if all the pages of the top layer become dirty upon saving, the saving time is still relatively short ($1/300$ of one second). The determination of whether the saving time is short enough is based on the frequency of periodic saving. If for example, a saving is performed every one second, then the maximum time consumed by the saving of the top layer is $1/300$ of the total time.

The size of a page is selected to be aligned with SSD page. In this example, the selected page of 64 KB is four time of the SSD page size (16 KB).

Figure 2C:
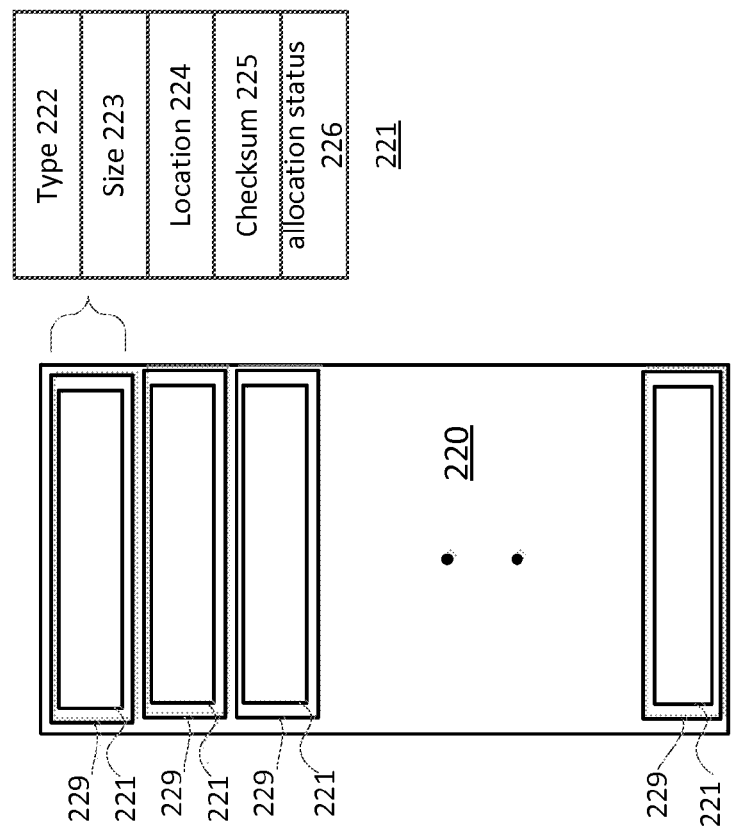
FIG. 2C illustrates a page according to an embodiment of the invention.
Figure 2B:
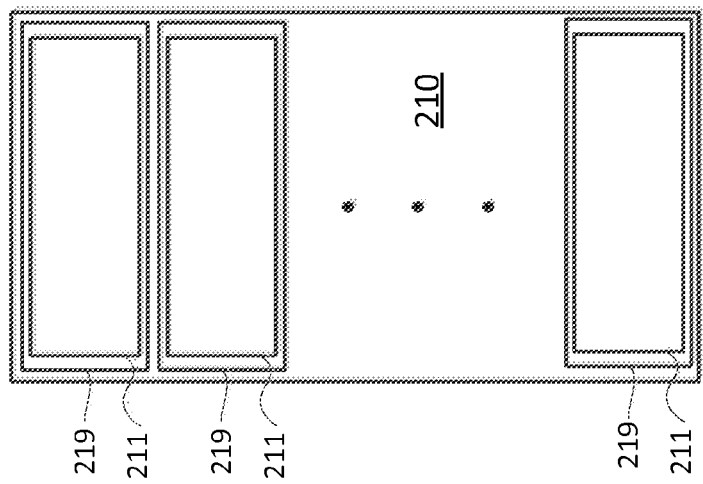
FIG. 2B illustrates a page according to an embodiment of the invention.

FIG. 2B illustrates a first (bottom) layer page 210 of hierarchical data structure 250 according to an embodiment of the invention. The bottom layer is also referred to as a data layer.

First layer 210 includes multiple slots 219, each slot is a container that contains an application object 211. The first layer is the lowest layer. The objects are provided by an application that uses the paging service. Slots 219 and application objects 211 are illustrated as having a fixed size. Alternatively, application objects 211 may have variant sizes of up to the fixed size of the slots. Alternatively, and in order to facilitate managing application objects of different sizes, there can be multiple page types, each configured with slots of different size for objects of the corresponding size.

The application can use a "put" (write) interface provided by paging module (also referred to as pager) 101 for writing the data of an application object. The put operation causes the provided object to become dirty and to trigger the chain of reallocations throughout the layers. The application can use a "get" (read) interface for reading the object and in turn the paging service will provide the object.

FIG. 2C illustrates a second layer page 220 of second layer (e.g., layer 252) OF hierarchical data structure 250 according to an embodiment of the invention. The second layer is also referred to as the lowest descriptors layer.

Second layer page 220 that contains slots 229 that includes descriptors 221 describing first level pages 210. The second layer is one layer above the first layer. Slots 229 are likely to have a size that differs from the size of slots 219, as demonstrated in FIGS. 2A and 2B. Each descriptor 221 includes fields that describe a first layer page 210 in the first layer. For example, each descriptor 221 may include: (i) object-type 222, which is the type of objects in a first layer page 210 described by this descriptor. In this case, the type of objects is "application object", but in higher layers the object-type field may include "descriptor-object"; (ii) size 223 is the size of the objects in first layer page 210, assuming all objects are of the same size. It may also describe the size of the slots; (iii) storage location 224 is the location of the page on the secondary storage. The location may be an address within the SSD or may be the sequence number of the page. In the latter case, the address in the SSD is calculated by: <the start address of the hierarchical data structure in the SSD>+*; (iv) checksum 234 for each object in first layer page 210. Alternatively, a checksum can be calculated for the entire page or for page segments which are smaller than a whole page but larger than an object; (v) allocation status 225—a data structure describing the allocation status of each slot, for example, a bitmap with a bit for each slot in the page, describing whether the slot is occupied or free.

Page 230 of the third layer 253 contains descriptors describing second layer pages 220. The format of third layer page 230 is similar to the format of second layer page 220, except that page 230 contains descriptors that describe a lower layer page that also contains descriptors, while second layer page 220 contains descriptors that describe a lowest layer page that contains application objects. Therefore, the field object-type included in descriptors of page 230 includes a value indicative of a descriptor-object, and size 223 of page 230 includes a size of descriptor, rather than of an application object.

Page 240, also called a root page or a top layer page, and contains descriptors describing the third layer pages. The format of root page 240 is identical to third layer page 230 and second layer page 220 and the format of its descriptors may be identical to the descriptors of second and third layer pages 220 and 230. Unlike pages of lower layers, the root page 240 is static, i.e., its descriptors are not subject to reallocation to other pages.

In addition to the hierarchical set of pages described above, additional data structure may be utilized for describing a hierarchical data structure. For example, a location data structure (denoted map 129), such as a static array, may be stored in the RAM, and includes an entry for each of the N pages of the hierarchical data structure with the following information: (i) whether or not the page is in the RAM; (ii) pointer to the page in the memory (if indicated that it is in RAM); (iii) pointer to the descriptor of the page. The address of the page in the SSD can be calculated according to the page index, for example: <SSD address>=n*64K+<offset>, where n is the index of the page, 64 Kb is a fixed size value of the pages and 'offset' is the start address of the hierarchical data structure in the SSD. Alternatively, the location data structure can include the SSD address.

The system further manages a list of dirty pages (dirty pages map), e.g., dirty list 111, of pages that include at least one slot with an updated object that was not yet written to the secondary storage. The system may also manage a pool (e.g., a list) of allocation candidate pages. An allocation candidate page is a page that is already dirty and is partially empty, i.e., includes at least one empty slot. In case there are no dirty pages with free space, an empty page or a partially empty page (having a certain minimum threshold of empty slots, e.g., 30%, 50%) will be allocated as a target for reallocations. Each layer may have its own pool of allocation candidate pages, or there may be at least two pools of allocation candidate pages, one for application objects and one for descriptors.

An object can be referred to by an object reference that consists of the page index (page sequence number) and a slot index within the page. The location of the page in the secondary storage can be calculated by multiplying the page index by the page size (e.g., 64 Kb) and optionally adding a well-known offset, where the pages of the hierarchical data structure start. The location of the object within the page can be calculated by multiplying the slot index by the field size 232 in the descriptor that describes the object's page.

Startup—Load Procedure

Upon system startup, a load procedure of at least part of the pages of the hierarchical data structure is performed. According to some embodiments of the invention, all the pages of the hierarchical data structure are loaded to the primary storage and stay resident in the primary memory, while being flushed to the secondary memory for saving a persistent copy. According to some other embodiments of the invention, the pages are classified into either: swappable or non-swappable pages and upon startup, only non-swappable pages are loaded to the primary storage, while the swappable pages will be loaded upon request to access the data stored therein.

The non-swappable pages are pages that should be permanently resident in the memory and should not be swapped in and out during normal operation. The non-swappable pages include at least all the pages above the bottom layer (i.e., excluding pages that include the application objects). The application objects may include a mix of swappable and non-swappable objects hosted in swappable and non-swappable pages. Only the non-swappable pages of the application objects are loaded upon startup.

The load procedure starts reading the top layer (e.g., page 240 of layer 254) from a well-known location on the secondary storage. This layer contains all the descriptors describing the pages in the next lower layer (e.g., layer 253). The pages of the next layer are loaded in a similar manner until reaching the bottom layer, i.e., the layer of the application data. Only the non-swappable application objects are loaded upon startup. The load procedure may traverse the pages recursively, starting with the root and load all the child pages that are flagged as non-swappable. The recursion stops as soon as first swappable page is encountered and the traverse is continued with the next sibling page.

Save Procedure

The save procedure is for saving a persistent copy of dirty pages in the secondary storage. According to a first embodiment, all the dirty pages are flushed periodically to the secondary storage. During the save procedure the dirty pages are frozen and are not available for new allocations of objects. Any new allocation that should occur while the save procedure is in process will start on an empty page or non-dirty page. So that essentially the frozen dirty pages represent the state of the objects at a point in time when the save started, so that the frozen pages can be safely written out without blocking ongoing changes to objects.

According to a second embodiment, the dirty pages can be flushed to the secondary storage constantly, as soon as they get full. Since updated objects are written in a write-out-of-place manner, full dirty pages can be considered as frozen, as they never being overwritten. Flushing as soon as the dirty page becomes full is not applicable to the top layer pages, since these pages are always updated in place. When using the second embodiment of flushing dirty pages as soon as they become full, there is still a need to perform periodic save procedure that include flushing partially full dirty pages (a page with at least one dirty slot) and only then, the top layer pages are flushed.

Figure 3:
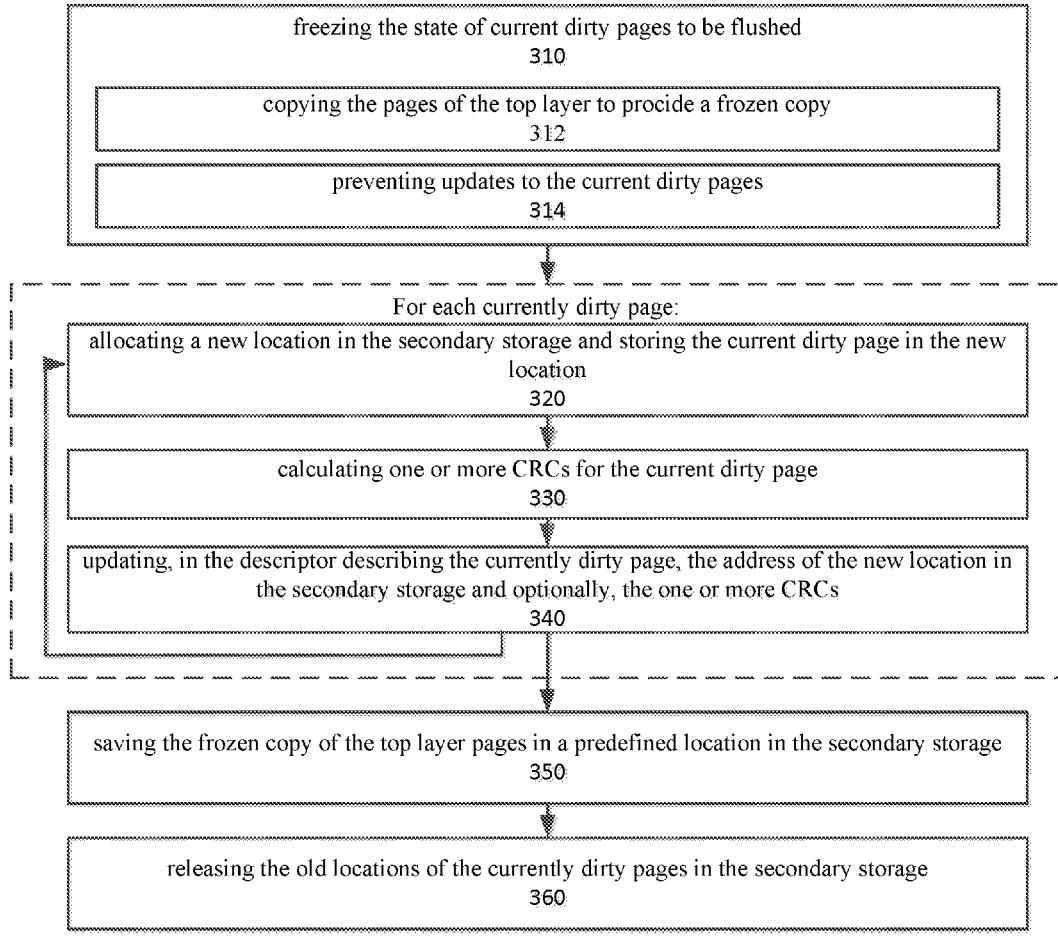
FIG. 3 illustrates a method according to an embodiment of the invention.

FIG. 3 illustrates a method 300 for periodically flushing dirty pages of the hierarchical data structure to the secondary storage according to an embodiment of the invention. Method 300 is applicable to both embodiments described above.

Method 300 starts with step 310 of freezing the state of currently dirty pages to be flushed. Currently dirty pages are pages that are dirty at the time of starting method 300. Pages that become dirty during the execution of method 300 will not participate in the flushing.

During step 310, updates to the hierarchical data structure are blocked, however, this blocking is for a very short time period, i.e., only for the duration of step 310. There is no need to block updates for the entire duration of the flushing, since the dirty pages to be flushed are frozen, while updates to objects being flushed are performed in a write out-of-place manner.

Step 310 includes step 312 of copying the pages of the top layer so as to provide a frozen copy. There are now two copies of the top layer pages, a frozen copy that will participate in the flushing and a working copy that will be used for ongoing updates that can be resumed after step 310.

Step 310 further includes, with regard to the dynamic (non-top) layers, step 314 of preventing updates to the currently dirty pages. The preventing may include: avoid adding new dirty pages to the list of dirty pages by e.g., starting a new list of dirty pages or copying the currently list to a safe place; removing from the pool of allocation candidate pages any of the currently dirty pages; marking the currently dirty pages as forbidden for allocation, etc. There is no need to prevent updating of objects that are being flushed, since such updates are performed in a write out-of-place manner, i.e., the new data is being written to other pages, rather than the pages being flushed.

The save flow may start from the pages at the bottom layer and proceed to upper layers. For each layer, except for the top layer, method 300 includes the following steps for each currently dirty page:

Step 320 includes allocating a new location in the secondary storage and storing the currently dirty page in the new location. The new location differs from the previous location of the currently dirty page. Writing the flushed pages to a new location, enables reverting to the previous version, in a case of a failure during flushing.

Step 320 may be optionally followed by step 330 of calculating one or more CRCs for the currently dirty page.

Step 320 or 330 is followed by step 340 of updating, in the descriptor describing the currently dirty page, the address of the new location in the secondary storage. Step 340 optionally includes, writing also the one or more CRCs to the descriptor. Note that the page that hosts the descriptor is already marked as dirty, as it was already updated when the updated object was reallocated, as will be described for FIG. 4.

If there are further dirty pages in dynamic layers, step 340 is followed by step 320. When all the currently dirty pages of the dynamic layers are saved, step 340 is followed by step 350 of saving the frozen copy of the top layer pages in a predefined location in the secondary storage. After step 350 is performed, the entire currently dirty pages are considered as safely stored. If the method failed before step 350, the previous state of stored pages is remained without any inconsistencies, as the root pages still points to a previous version pages, which in turns points to previous versions of lower layers pages, and so on for the entire chain.

Step 350 is followed by step 360 of releasing the old locations of the currently dirty pages in the secondary storage.

Write New Content Procedure

Figure 4:
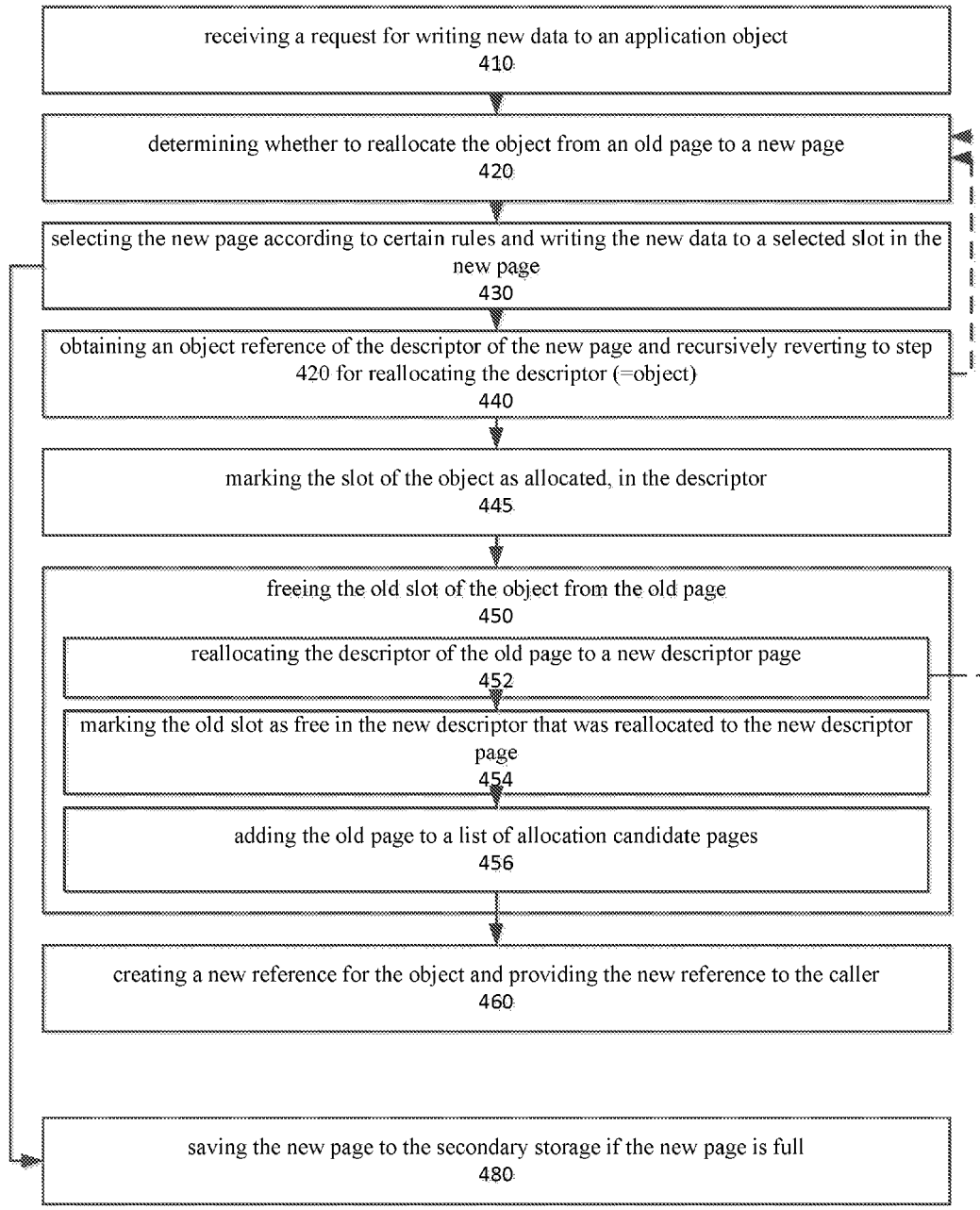
FIG. 4 illustrates a method according to an embodiment of the invention.

FIG. 4 illustrates method 400 for writing new application data to objects in the hierarchical data structure according to an embodiment of the invention.

Method 400 starts with step 410 of receiving, from an application, a request for writing new data to an object. The request includes at least the object reference as known to the application and the new data. The object reference is indicative of the page that stores the object and the slot within the page. The object is an application object. In the following steps the object may be either an application object or a descriptor, depending on the depth of the recursion. The first iteration of the recursion is for application object and the deeper recursion iterations are for descriptors.

Step 410 is followed by step 420 of determining whether to reallocate the object from an old page (a page currently hosting the object) to a new page. The object is reallocated if at least both of the following conditions are fulfilled: (i) the object is not hosted at the top (static) layer; and (ii) the page that hosts the object is still clean. The object may not be reallocated if at least one of the following conditions is fulfilled: (i) the page is in the top layer and therefore is static; (ii) the page is already dirty.

If it is determined to reallocate the object, step 420 is followed by step 430 of selecting the new page according to certain rules and writing the new data of the object to a selected slot in the new page. The certain rules include: the selecting is from a list of dirty pages that are not full, i.e., pages that have at least one dirty slot and at least one empty slot. The selection of the new page may be further responsive to the size of the object, i.e. a page with slots of a size that is equal or slightly larger than the size of the object. If such a page does not exist, then an empty page is selected. The empty page, which now becomes dirty, will be a candidate for subsequent reallocation of objects. Step 430 may include utilizing a pool of allocation candidate pages for selecting the new page.

Step 430 is followed by step 440 of determining an object reference of the descriptor of the new page and recursively reverting to step 420 for reallocating the descriptor, but this time recursive step 420 and any subsequent step (430, 440) is performed with regard to the object reference of the descriptor. The recursion flow is illustrated by dashed lines. Sequence of steps of the same iteration level is illustrated by solid lines.

Step 440 is followed by step 445 that is executed after the execution of the recursion steps with regard of reallocating the descriptor. Step 445 includes marking the slot of the object as being in status 'allocated', in the descriptor, in its new page.

Step 445 is followed by step 450 of freeing the old slot (the slot that hosted the object prior to reallocation) of the object from the old page. Indicating a slot as free does not require any change to the page of the object but only requires changes in the descriptor of the object. Therefore, step 450 includes step 452 of reallocating the descriptor of the old page to a new descriptor page. The reallocating includes recursively reverting to step 420. Step 450 further includes step 454 of marking the old slot as free in the descriptor that was reallocated to the new descriptor page. Since the old page of the descriptor is now dirty and have at least one free slot, step 450 may further include step 456 of adding the old page of the descriptor to a pool of allocation candidate pages.

Step 450 is performed only when an existing application object is updated. If the application object is new, this step is omitted.

Step 450 is followed by step 460 of creating a new reference for the object and providing the new reference to the caller. The new reference is indicative of the new page and the selected slot that was chosen for the object. The caller is either the application that requested the update or a previous iteration of the recursion.

Method 400 may further include step 480 that follows step 430 of saving the new page to the secondary storage, if the new page (that was selected for storing the object data) becomes full after adding the object.

Deleting Objects

When freeing space of a deleted object, the page that stores the object is not changed and therefore does not become dirty. Only the descriptor is changed so as to unmap the slot that holds the object, by marking in the allocation status 225 of the descriptor that the respective slot in the object's page is free. The flow of deleting an object includes step 450 of method 400 and steps included in step 450, either directly or recursively.

Figure 5:
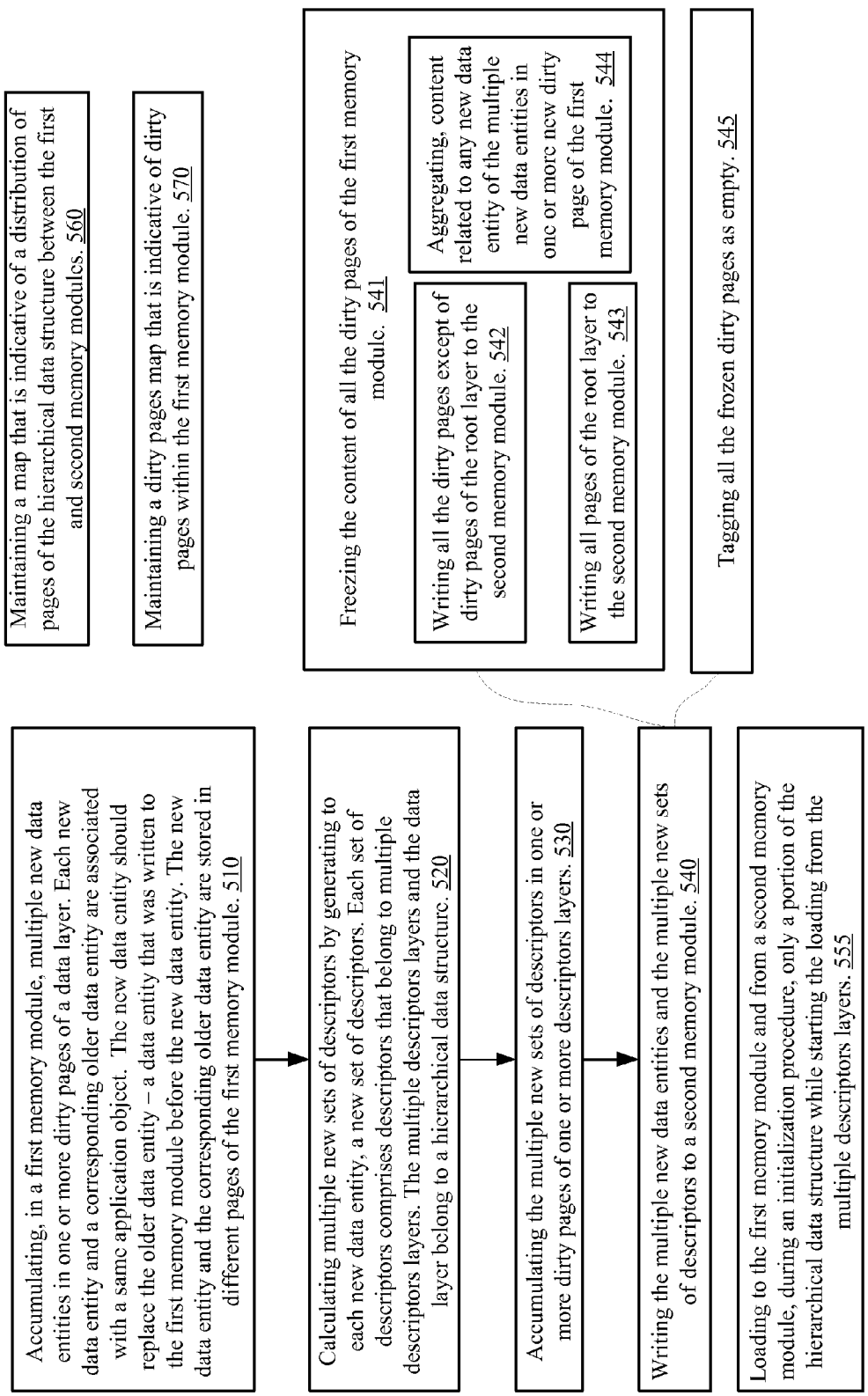
FIG. 5 illustrates a method according to an embodiment of the invention.

FIG. 5 illustrates method 500 according to an embodiment of the invention.

Method 500 may start by step 510 of accumulating, in a first memory module, multiple new data entities in one or more dirty pages of a data layer.

Each new data entity and a corresponding older data entity are associated with a same application object. The new data entity should replace the older data entity —a data entity that was written to the first memory module before the new data entity. The older data entity, which is an older version of the application object, may contain clean data, i.e., data that was already written to a secondary memory module, while the new data entity is a modified version of the older data entity that needs to be written to the secondary memory module.

The new data entity and the corresponding older data entity are stored in different pages of the first memory module.

It is noted that step 510 may be preceded by determining a structure of the hierarchical data structure in response to a predefined size ratio between adjacent layers of the hierarchical data structure. See, for example, table 1. The predefined ratio may be dictated by the size of the pages and the size of the descriptors. The determining of the structure of the hierarchical data structure may include determining the number of hierarchies, and ensuring that the root layer includes a limited number of pages (below a predetermined number of pages).

Step 510 may be followed by step 520 of calculating multiple new sets of descriptors by generating to each new data entity, a new set of descriptors.

Each set of descriptors comprises descriptors that belong to multiple descriptors layers.

The multiple descriptors layers and the data layer belong to a hierarchical data structure. See, for example hierarchical data structure 250 of FIG. 2A.

Referring to FIG. 2A—a set of descriptors related to a new data entity may include (a) a first descriptor of the second layer 252 that points to a page of first layer that stores the new data entity, (b) a second descriptor of the third layer 253 that points to a page of the second layer that stores the first descriptor, and (c) a third descriptor of the root layer 254 that points to a page of the third layer that stores the second descriptor. The first descriptor includes a change in the allocation status of the page of first layer that stores the new data entity. The status allocation is changed as a result of adding the new data entity to the page of the first layer. For example, the allocation status is changed so as to include an indication that a slot that was previously free is now occupied (with the new data entity). The second and the third descriptors include similar changes in their allocation status with regard to the pages of the second and third layers that now host the first and second descriptors.

Each corresponding older data entity is associated with a corresponding set of descriptors.

The new set of descriptors and the corresponding set of descriptors (related to the older data unit) may be stored in different pages of the first memory module.

Step 520 may be followed by step 530 of accumulating the multiple new sets of descriptors in one or more dirty pages of one or more descriptors layers. It is noted that steps 520 and 530 may be merged.

Step 530 may be followed by step 540 of writing the multiple new data entities and the multiple new sets of descriptors to a second memory module.

Method 300 of FIG. 3 is a non-limiting example of step 540.

Step 540 may include freezing (541) the content of all the dirty pages of the first memory module. The freezing may include preventing any updates to any of the dirty pages while writing. For example, by aggregating (544), during the execution of (a) and (b) content related to any new data entity of the multiple new data entities in one or more new dirty page of the first memory module. The content may include a newer data entity (associated with the same application object as the new data entity) and any descriptor related to the newer data entity. The new dirty pages are pages that were not dirty when step 540 started.

Step 540 may further include:
a. Writing (542) all the dirty pages except of dirty pages of the root layer to the second memory module.
b. Writing (543) all pages of the root layer to the second memory module.
c. Unfreeze the content of all the dirty pages of the first memory module and marking then as non-dirty pages.

According to an embodiment of the invention the data layer and all of the multiple descriptor layers except of a root layer are dynamic layers in which new content of a given layer that replaces an older content of the given layer is stored, within the given layer, at a different location from a location of the new content. The location of the new content is one or more dirty pages that accumulate dirty data. The location of the older content is one or more pages that remain clean.

A non-limiting example of such hierarchical data structure is illustrated in FIG. 2A. It is noted that the root layer may also be a dynamic layer.

Step 520 may be executed on a layer to layer basis. Accordingly—step 520 may include dynamically allocating in each descriptor layer, except a root layer, a dirty page for accumulating new descriptors of the new sets of descriptors that belong to the descriptor layer. It is noted that this is not necessarily so and that dirty pages of one layer of the hierarchical data structure may be used to accumulate descriptors of more than a single layer.

According to an embodiment of the invention each layer of the hierarchical data structure is smaller than another layer of a lower level in the hierarchical data structure.

According to an embodiment of the invention the multiple descriptors layers comprise a lowest descriptors layer and one or more higher descriptors layers. Wherein the lowest descriptors layer stores lowest descriptors, each lowest descriptor is indicative of a status of a page of the data layer; and each higher descriptors layer of the one or more higher descriptors layers stores higher descriptors, each higher descriptor is indicative of a status of a page of a lower descriptors layer of the multiple descriptors layers;

According to an embodiment of the invention a given lowest descriptor comprises status information about a given page of the data layer, wherein the status information is indicative of status (allocation status) of slots of the given page of the data layer, wherein the status of the slots indicates which slots of the given page of the data layer are occupied and which slots of the given page of the data layer are free.

According to an embodiment of the invention a given lowest descriptor comprises status information about a size of application objects stored in the given page of the data layer.

According to an embodiment of the invention the multiple descriptors layers are stored in a first memory module; wherein the method further comprises storing a persistent copy of the hierarchical data structure in the second memory module.

According to an embodiment of the invention method 500 may include maintaining a list of dirty pages of the data layer or of the entire hierarchical data structure. See, for example dirty list 111 and dirty list 112 of FIG. 1.

Method 500 may include step 555 of loading to the first memory module and from a second memory module, during an initialization procedure, only a portion of the hierarchical data structure while starting the loading from the multiple descriptors layers. Step 555 may precede step 510.

Alternatively, step 555 may include loading the entire hierarchical data structure.

Step 555 may include at least one out of:
a. Loading, during the initialization procedure, only non-swappable pages of the hierarchical data structure.
b. Loading, during an initialization procedure, only the multiple descriptors layers.

Method 500 may include step 560 of maintaining a map that is indicative of a distribution of pages of the hierarchical data structure between the first and second memory modules.

Method 500 may include step 570 of maintaining a dirty pages map that is indicative of dirty pages within the first memory module.

According to an embodiment of the invention the replacement of an older data unit by a new data unit may also be followed by calculating, aggregating and writing to the second memory module an updated set of descriptors.

An updated set of descriptors is calculated per each older data entity that is to be replaced by a new data entity (that was received by the first memory module).

Each updated set of descriptors indicates that at least one lowest descriptor of a corresponding set of descriptors is irrelevant.

Figure 6:
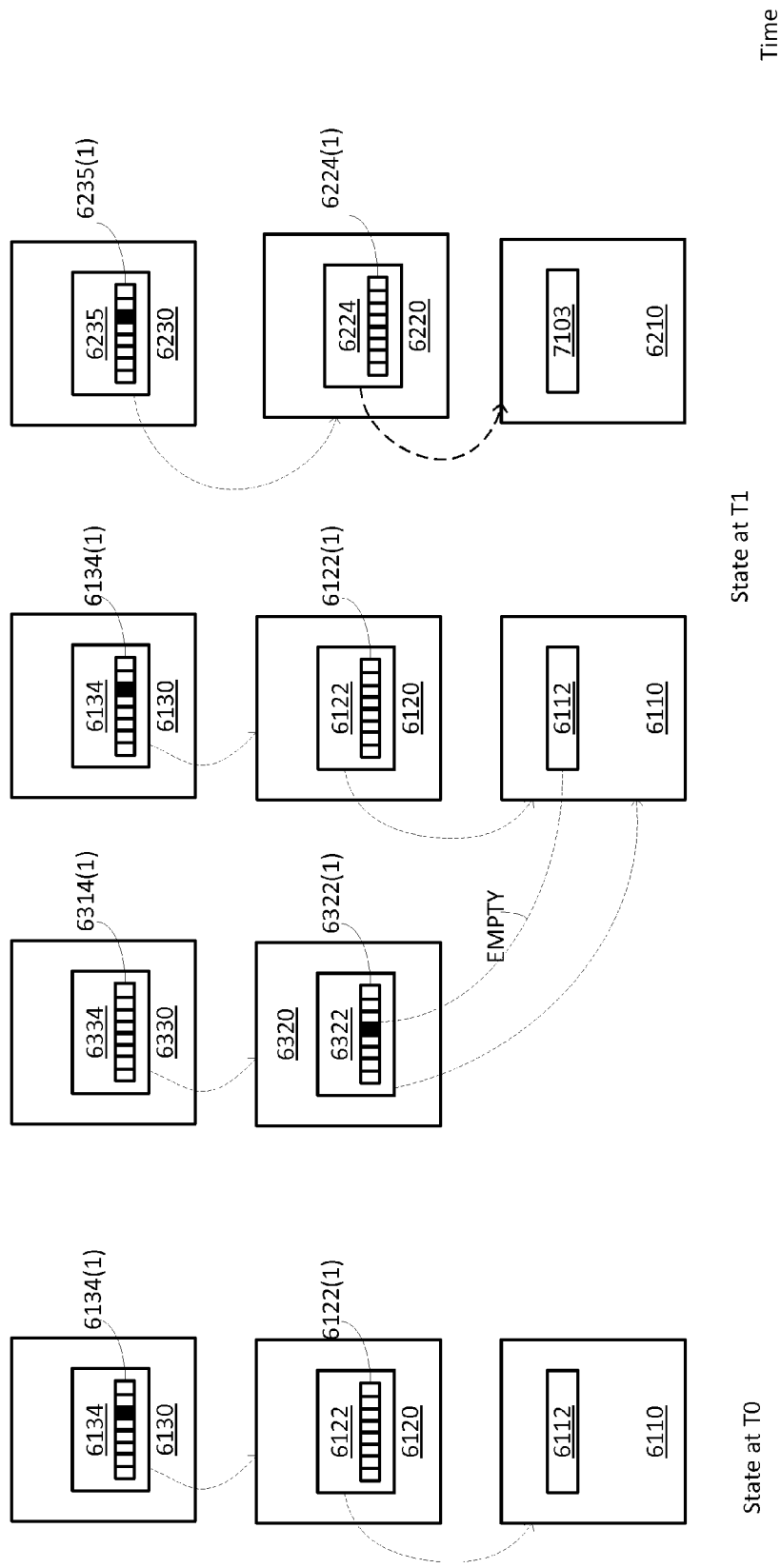
FIG. 6 illustrates various pages according to an embodiment of the invention.

FIG. 6 illustrates various data entity and various descriptors according to an embodiment of the invention.

The left side of FIG. 6 illustrates three memory pages— data page 6110, lowest descriptor page 6120 and higher descriptor page 6130. These pages may belong to layers 251, 252 and 253 of FIG. 2A respectively. For simplicity of explanation a root layer page was not shown.

Data page 6110 may store an older data unit 6112.

Data page 6120 may store lowest descriptor 6122 and allocation status such as bit map 6122(1) that indicates the status of the slots of data page 6110.

At a first point of time (T0) the older data unit 6112 is the most updated version of a given application object and bit map 6122(1) includes a given bit that indicates that the slot that stores older data unit 6112 is occupied.

Page 6130 may store a higher descriptor 6134 and allocation status such as bit map 6134(1) that indicates the status of the slots of page 6120. Map 6134(1) indicates that at least the slot in data page 6120 that stores lowest descriptor 6122 is occupied.

Lowest descriptor 6122 and higher descriptor 6134 are part of an older set of descriptors that is associated with older data unit 6112.

At the first point in time pages 6110, 6120 and 6130 are clean pages.

The center and the right side of FIG. 6 illustrate pages 6110, 6120 and 6130, new data unit 7103 (intended to replace older data unit 6112), pages 6210, 6220, 6230, 6320 and 6330.

Page 6220 may store lowest descriptor 6222 and allocation status such as bit map 6222(1) that indicates the status of the slots of data page 6210.

At a second point of time (T1) the new data unit 7103 is the most updated version of the given application object and bit map 6222(1) includes a given bit that indicates that the slot that stores new data unit 7103 is occupied.

Page 6230 may store a higher descriptor 6234 and allocation status such as bit map 6234(1) that indicates the status of the slots of page 6220. Bit map 6234(1) indicates that at least the slot in page 6220 that stores lowest descriptor 6222 is occupied. In FIG. 6 a white bit of the bit map indicate that the slot it is associated with is occupied and black bit of the bit map indicates that the slot is vacant.

Lowest descriptor 6222 and higher descriptor 6234 are part of a new set of descriptors that is associated with new data unit 7103.

Page 6320 may store lowest descriptor 6322 and allocation status such as bit map 6322(1) that indicates the status of the slots of data page 6110. As the older data unit was replaced by new data unit 7103 the bit map 6322 indicates that the slot that stores older data unit 6112 is vacant (or irrelevant).

Page 6330 may store a higher descriptor 6334 and allocation status such as bit map 6334(1) that indicates the status of the slots of page 6320. Bit map 6334(1) indicates that at least the slot in page 6320 that stores lowest descriptor 6322 is occupied.

Lowest descriptor 6322 and higher descriptor 6334 are part of an updated set of descriptors that is associated with older data unit 6112. The update is for indicating that the older data unit 6112, which is the older version of the application object, is no longer relevant.

Figure 7:
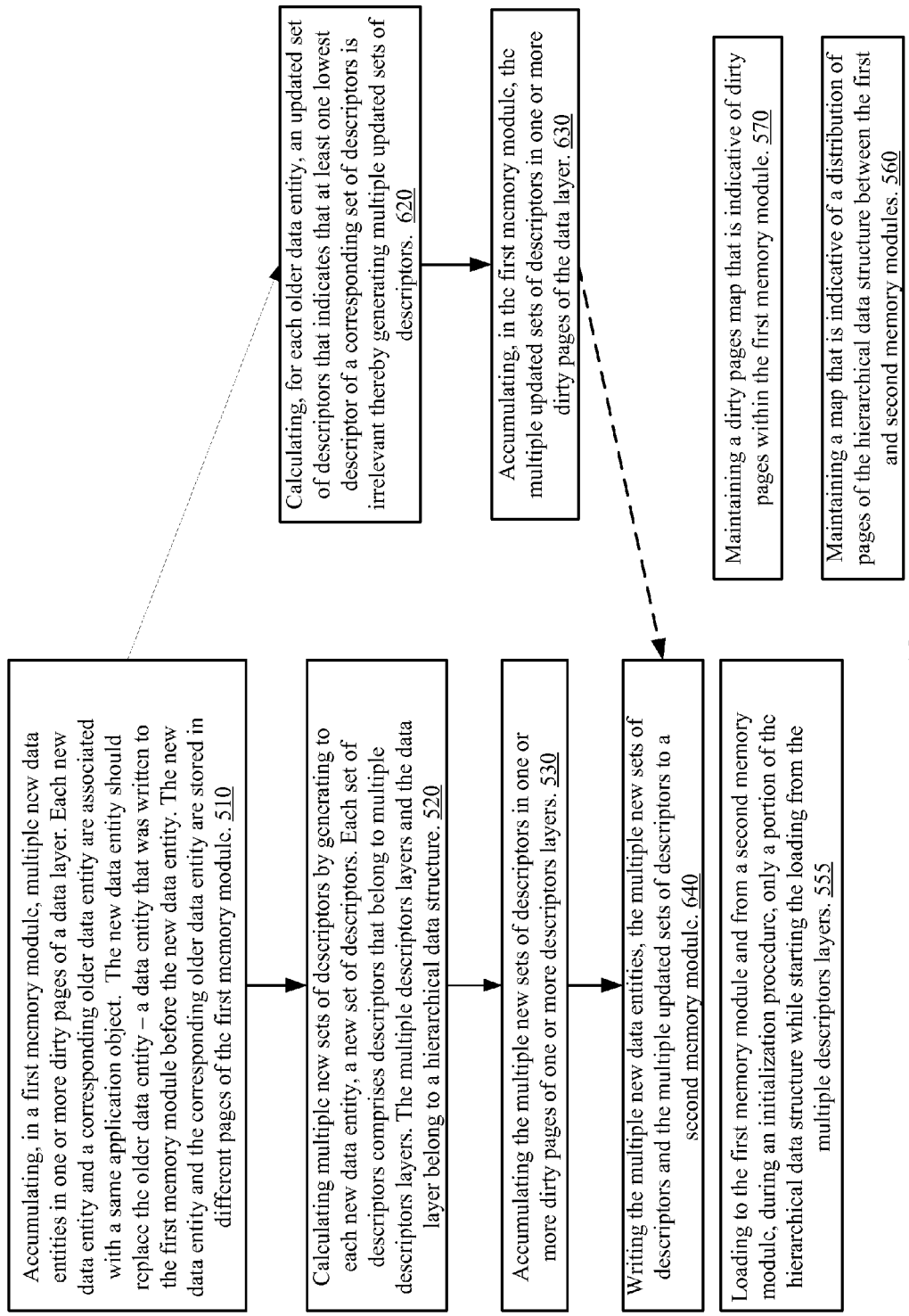
FIG. 7 illustrates a method according to an embodiment of the invention.

FIG. 7 illustrates method 600 according to an embodiment of the invention.

Method 600 may include a sequence of steps 510, 520 and 530.

Step 510 may also be followed by step 620 of calculating, for each older data entity, an updated set of descriptors that indicates that at least one lowest descriptor of a corresponding set of descriptors is irrelevant thereby generating multiple updated sets of descriptors.

Step 620 may be followed by step 630 of accumulating, in the first memory module, the multiple updated sets of descriptors in one or more dirty pages of the data layer.

Step 630 and step 530 may be followed by step 640 of writing the multiple new data entities, the multiple new sets of descriptors and the multiple updated sets of descriptors to a second memory module.

Method 600 may also include steps 555, 560 and 570.

Any reference to the term "comprising" or "having" should be interpreted also as referring to "consisting" of "essentially consisting of". For example—a health monitor that comprises certain components can include additional components, can be limited to the certain components or may include additional components that do not materially affect the basic and novel characteristics of the health monitor—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for writing data objects, the method comprises:
    accumulating, in a first memory module, multiple new data entities in one or more dirty pages of a data layer; wherein each new data entity and a corresponding older data entity are associated with a same application object; wherein the accumulating comprises storing each new data entity in a page that differs from a page that stores the corresponding older data entity;
    calculating multiple new sets of descriptors by generating to each new data entity, a new set of descriptors; wherein each set of descriptors comprises descriptors that belong to multiple descriptors layers; wherein the multiple descriptors layers and the data layer belong to an hierarchical data structure;
    accumulating the multiple new sets of descriptors in one or more dirty pages of one or more descriptors layers; wherein each corresponding older data entity is associated with a corresponding set of descriptors; wherein the accumulating comprises storing each new set of descriptors in a page that differs from a page that stores a corresponding set of descriptors;
    wherein the data layer and all of the multiple descriptors layers except of a root layer are dynamic layers in which new content of a given layer that replaces an older content of the given layer, is stored within the given layer at a different location from a location of the older content;
    and
    writing the multiple new data entities and the multiple new sets of descriptors to a second memory module.

2. The method according to claim 1, comprising dynamically allocating in each descriptor layer of the multiple descriptors layers except the root layer, a dirty page for accumulating new descriptors of the new sets of descriptors that belong to the descriptor layer.

3. The method according to claim 1, comprising dynamically allocating in each descriptor layer of the multiple descriptors layers a dirty page for accumulating new descriptors of the new sets of descriptors that belong to the descriptor layer.

4. The method according to claim 1, wherein each layer of the hierarchical data structure is smaller than another layer of a lower level in the hierarchical data structure.

5. The method according to claim 1, wherein the multiple descriptors layers comprise a lowest descriptors layer and one or more higher descriptors layers; wherein the lowest descriptors layer stores lowest descriptors, each lowest descriptor is indicative of a status of a page of the data layer; and wherein each higher descriptors layer of the one or more higher descriptors layers stores higher descriptors, each higher descriptor is indicative of a status of a page of a lower descriptors layer of the multiple descriptors layers.

6. The method according to claim 1, wherein the multiple descriptors layers comprise a lowest descriptors layer and one or more higher descriptors layers; wherein a given lowest descriptor comprises status information about a given page of the data layer, wherein the status information is indicative of status of slots of the given page of the data layer, and wherein the status of the slots indicates which slots of the given page of the data layer are occupied and which slots of the given page of the data layer are free.

7. The method according to claim 1, further comprises storing a persistent copy of the hierarchical data structure in the second memory module.

8. The method according to claim 1, comprising maintaining a list of dirty pages of the data layer.

9. The method according to claim 1, comprising maintaining a list of dirty pages of the hierarchical data structure.

10. The method according to claim 1, comprising loading to the first memory module and from a second memory module, during an initialization procedure, only a portion of the hierarchical data structure while starting the loading from the multiple descriptors layers.

11. The method according to claim 1, comprising loading to the first memory module and from a second memory module, during an initialization procedure, only non-swappable pages of the hierarchical data structure.

12. The method according to claim 1, comprising loading to the first memory module and from a second memory module, during an initialization procedure, only the multiple descriptors layers.

13. The method according to claim 1, further comprising determining a structure of the hierarchical data structure in response to a predefined size ratio between adjacent layers of the hierarchical data structure.

14. The method according to claim 1, wherein the writing of the multiple new data entities and the multiple new sets of descriptors to the second memory module comprises freezing all dirty pages that store the multiple new data entities and the multiple new sets of descriptors.

15. The method according to claim 1, wherein the multiple new sets of descriptors comprise multiple root layer descriptors of the root layer and multiple other descriptors; wherein the writing of the multiple new data entities and the multiple new sets of descriptors to the second memory module comprises: writing all dirty pages that store the multiple data entities and the multiple other descriptors to the second memory module; writing the root layer to the second memory module; and aggregating, during the writing to the second memory module of the root layer and all the dirty pages that store the multiple data entities and the multiple other descriptors, content related to any new data entity of the multiple new data entities, in one or more new dirty page of the first memory module.

16. The method according to claim 1 comprising marking a space occupied by an older data entity as irrelevant.

17. The method according to claim 1 comprising generating, for each older data entity, an updated set of descriptors that indicates that at least one lowest descriptor of a corresponding set of descriptors is irrelevant thereby generating multiple updated sets of descriptors.

18. The method according to claim 17 wherein the generating of the multiple updated sets of descriptors comprises accumulating, in the first memory module, the multiple updated sets of descriptors in one or more dirty pages of the data layer.

19. A non-transitory computer readable medium that stores instructions that once executed by a storage system will cause the storage system to: accumulate, in a first memory module, multiple new data entities in one or more dirty pages of a data layer; wherein each new data entity and a corresponding older data entity are associated with a same application object; wherein the new data entity and the corresponding older data entity are stored in different pages of the first memory module; calculate multiple new sets of descriptors by generating to each new data entity, a new set of descriptors; wherein each set of descriptors comprises descriptors that belong to multiple descriptors layers; wherein the multiple descriptors layers and the data layer belong to an hierarchical data structure; wherein each corresponding older data entity is associated with a corresponding set of descriptors; wherein a new set of descriptors and a corresponding set of descriptors are stored in different pages of the first memory module; accumulate the multiple new sets of descriptors in one or more dirty pages of one or more descriptors layers; wherein the data layer and all of the multiple descriptors layers except of a root layer are dynamic layers in which new content of a given layer that replaces an older content of the given layer, is stored within the given layer at a different location from a location of the older content; and write the multiple new data entities and the multiple new sets of descriptors to a second memory module.

20. A storage system comprising a first memory module, a second memory module and a controller; wherein the controller is configured to accumulate, in the first memory module, multiple new data entities in one or more dirty pages of a data layer; wherein each new data entity and a corresponding older data entity are associated with a same application object; wherein the new data entity and the corresponding older data entity are stored in different pages of the first memory module; calculate multiple new sets of descriptors by generating to each new data entity, a new set of descriptors; wherein each set of descriptors comprises descriptors that belong to multiple descriptors layers; wherein the multiple descriptors layers and the data layer belong to an hierarchical data structure; wherein each corresponding older data entity is associated with a corresponding set of descriptors; wherein a new set of descriptors and a corresponding set of descriptors are stored in different pages of the first memory module; wherein the data layer and all of the multiple descriptors layers except of a root layer are dynamic layers in which new content of a given layer that replaces an older content of the given layer is stored, within the given layer at a different location from a location of the older content; accumulate the multiple new sets of descriptors in one or more dirty pages of one or more descriptors layers; and write the multiple new data entities and the multiple new sets of descriptors to the second memory module.

* * * * *